United States Patent [19]
Rudeen

[11] Patent Number: 5,347,121
[45] Date of Patent: Sep. 13, 1994

[54] VARIABLE FOCUS OPTICAL SYSTEM FOR DATA READING

[75] Inventor: Robert W. Rudeen, Eugene, Oreg.

[73] Assignee: Spectra-Physics Scanning Systems, Inc., Eugene, Oreg.

[21] Appl. No.: 992,932

[22] Filed: Dec. 18, 1992

[51] Int. Cl.⁵ .................................. G06K 7/10
[52] U.S. Cl. ............................. 250/235; 250/568; 235/472
[58] Field of Search .............. 250/235, 555–557, 250/566, 568; 235/462, 467, 472; 359/370

[56] References Cited

U.S. PATENT DOCUMENTS

| | | | |
|---|---|---|---|
| 2,811,081 | 10/1957 | Praeger | 88/57 |
| 3,004,470 | 10/1961 | Rühle | 88/57 |
| 3,928,759 | 12/1975 | Sansone | 250/568 |
| 3,995,166 | 11/1976 | Hobart et al. | 250/568 |
| 4,333,006 | 6/1982 | Gorin et al. | 235/457 |
| 4,335,302 | 6/1982 | Robillard | 235/462 |
| 4,367,009 | 1/1983 | Suzki | 350/6.5 |
| 4,368,947 | 1/1983 | Yoshinaga et al. | 359/370 |
| 4,407,569 | 10/1983 | Piller et al. | 359/370 |
| 4,414,468 | 11/1983 | Lauer et al. | 235/462 |
| 4,415,224 | 11/1983 | Dickson | 350/3.71 |
| 4,560,862 | 12/1985 | Eastman et al. | 235/467 |
| 4,575,625 | 3/1986 | Knowles | 235/467 |
| 4,591,242 | 5/1986 | Broochman et al. | 350/3.71 |
| 4,678,288 | 7/1987 | Lonsdale et al. | 350/432 |
| 4,721,362 | 1/1988 | Brody et al. | 359/370 |
| 4,748,316 | 5/1988 | Dickson | 235/454 |
| 4,786,798 | 11/1988 | Lonsdale | 250/216 |
| 4,799,164 | 1/1989 | Hellekson et al. | 235/467 |
| 4,808,804 | 2/1989 | Krichever et al. | 235/467 |
| 4,816,660 | 3/1989 | Swartz et al. | 235/472 |
| 4,818,886 | 4/1989 | Drucker | 250/566 |
| 4,820,911 | 4/1989 | Arackellian et al. | 235/467 |
| 4,833,314 | 5/1989 | Pepper et al. | 359/370 |
| 4,861,975 | 7/1989 | Kino et al. | 250/201 |
| 4,916,318 | 4/1990 | Iima | 250/568 |
| 4,939,355 | 7/1990 | Rando | 235/467 |
| 4,946,234 | 8/1990 | Sasada et al. | 350/6.6 |
| 5,051,567 | 9/1991 | Tedesco | 235/454 |
| 5,073,702 | 12/1991 | Schuhmacher | 235/467 |
| 5,080,456 | 1/1992 | Katz et al. | 359/214 |
| 5,081,364 | 1/1992 | Wike, Jr. | 250/555 |
| 5,170,277 | 12/1992 | Bard et al. | 235/462 |

FOREIGN PATENT DOCUMENTS 0042946  6/1982  European Pat. Off. .

OTHER PUBLICATIONS

IBM Technical Disclosure Bulletin, vol. 24, No. 9 (Feb., 1982) entitled "Time Multiplexed Two-Beam Scanner" by E. C. Brookman.

Primary Examiner—David C. Nelms
Assistant Examiner—Stephane B. Allen
Attorney, Agent, or Firm—Lyon & Lyon

[57] ABSTRACT

An optical system and method for data reading in which a light source generates an optical beam directed toward an object to be read and a variable aperture mechanism positioned in the outgoing light path establishes at least two separate focal planes. The variable aperture device may comprise a variable aperture system in which the size of the aperture is selectively varied about a range within the diffractive limit of the light beam. A preferred aperture mechanism is an LCD aperture with one or more aperture regions which are selectively or consecutively activated. The optical system therefore establishes two or more separate focal planes from a single light source resulting in greater depth of field or multiple depths of field.

37 Claims, 7 Drawing Sheets

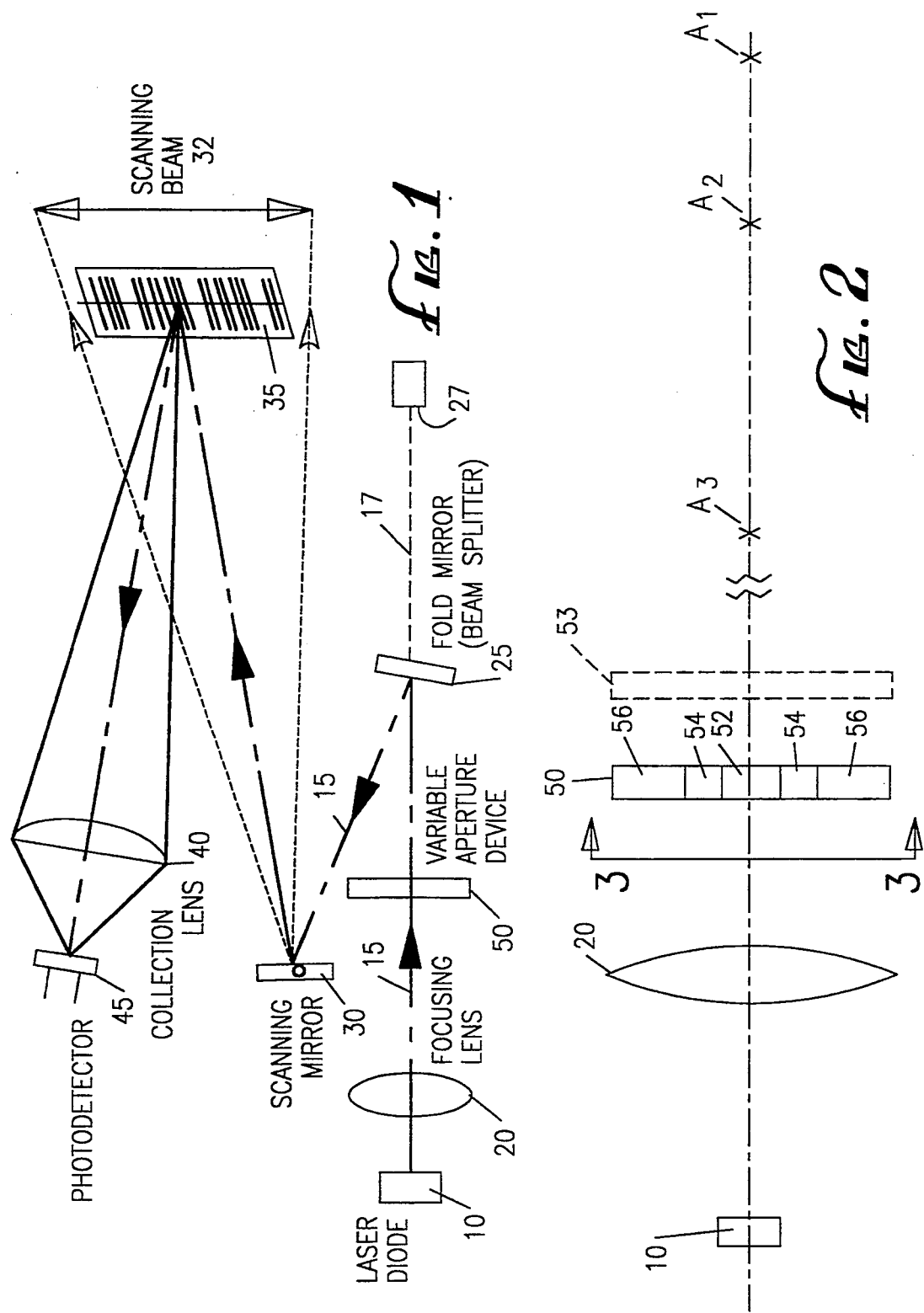

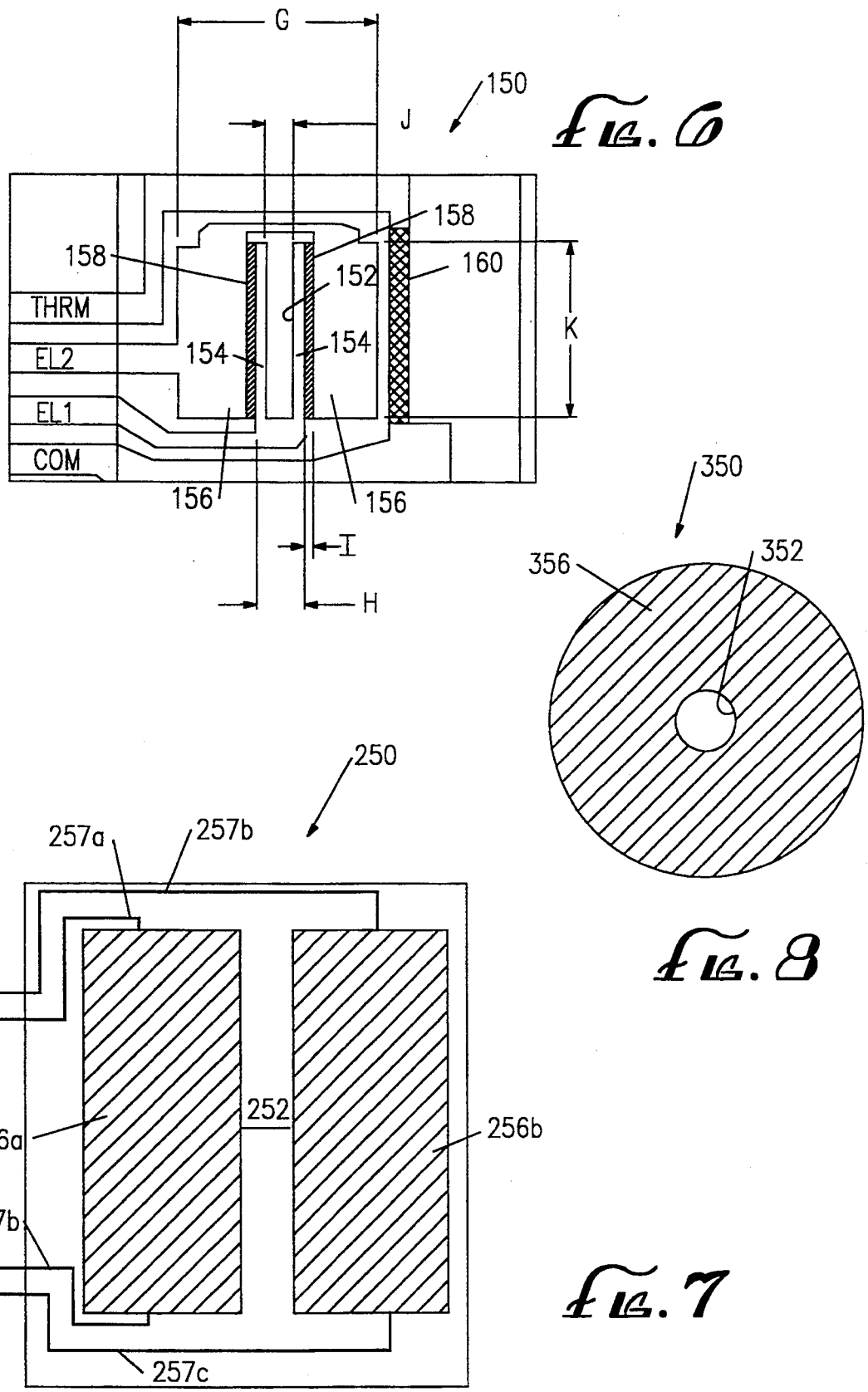

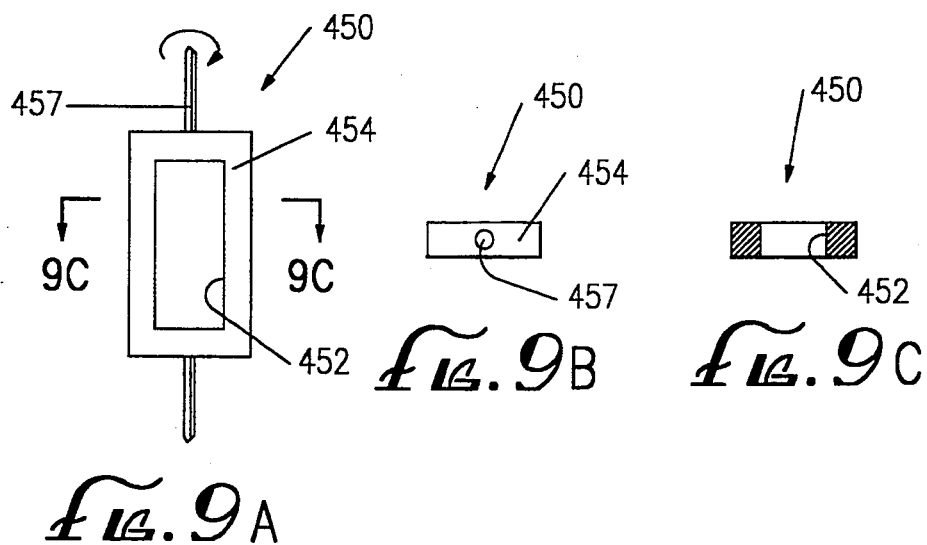
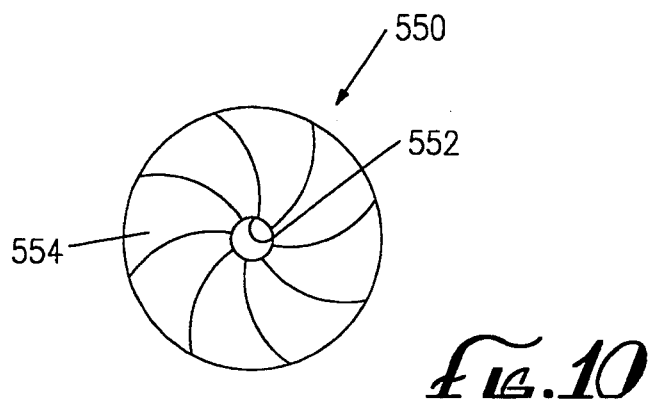
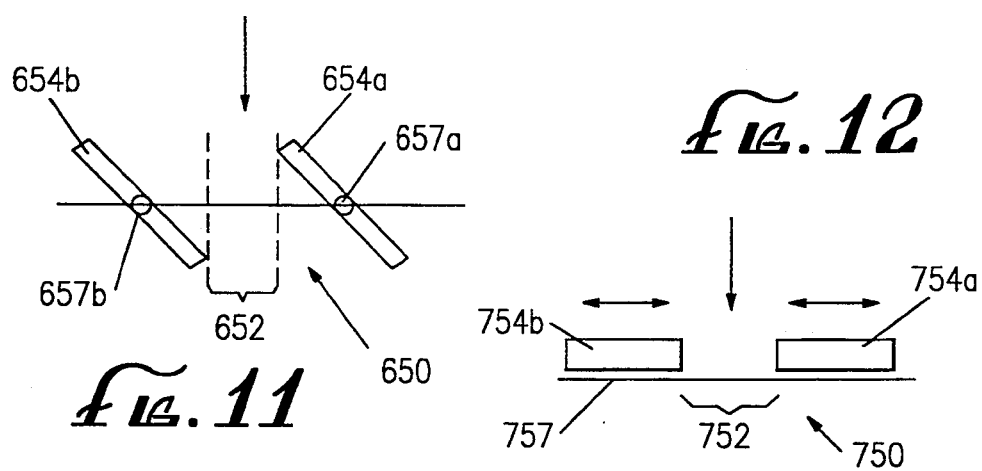

VARIABLE FOCUS OPTICAL SYSTEM FOR DATA READING

BACKGROUND OF THE INVENTION

The field of the present invention relates to data reading systems and particularly to an optical system having an expanded depth of field. The invention is especially suitable for use with a symbol scanning system for reading bar codes such as those found on consumer products, for example the UPC code. The invention is suitable for stationary or handheld scanners.

Bar code scanners, as any optical system, depend upon focused optics for effective and accurate performance. Typical bar code scanners employ a source of coherent light from a laser or laser diode with the light scanned in various directions across a window. Other scanners using non-coherent light sources have also been suggested such as disclosed in U.S. Pat. No. 4,335,302.

In a detection system such as a bar code scanning device employing a focusing lens, a light source such as a laser, laser diode, or non-coherent light source (e.g. light emitting diode) emits light which passes through and is focused by the focusing lens. The object containing the bar code is passed through the focused beam and if the bar code is sufficiently close to the beam focal point, reflected light from the bar code may be detected resulting in a successful scan.

As known by one skilled in the art, a focal point is typically not a discrete point but may be referred to as a "waist" which is the position along the beam axis where the "cone" of light from the light source reaches a minimum spot size, as measured in parallel to the direction of spot motion.

A problem arises when the bar code or object being scanned does not fall sufficiently close to the focal point or waist, that is when the spot size or waist diameter is too large to successively read a symbol. By way of example, in a supermarket checkout application, a product bearing the UPC bar code is passed at a certain distance in front of the window of the checkout scanner. The checkout scanner is designed with its waist of a given diameter positioned at a certain distance from the window where the bar code is expected to pass. The checkout clerk must become familiar with the proper distance to pass the object in front of the window, that is the bar code must pass sufficiently close to the scanner focal point or waist (i.e. within its depth of field) in order to achieve a successful scan.

However, in some applications, it may be desirable for the scanning device to function over a range of distances. There have been several suggestions on how to increase the depth of field or selectively choose a depth of field available for a particular scanner. In one system, a focusing lens is designed with an axially movable lens element (such as a zoom lens) to permit changing of the position of the focal point. Such systems require complicated mechanical lens adjustment and/or may require the user to manually make focusing adjustments. It is desirable to eliminate the need for focus adjustment either by mirror or lens adjustment and be able to achieve a wide range or variable range of focal planes.

Another attempt at providing multiple depths of field is described in U.S. Pat. No. 4,560,862 which uses a rotatable optical polygon mirror having a plurality of facets, each mirror facet being of a different curvature. As the polygon mirror rotates, a different mirror facet reflects the beam from the light source along an optical path, each mirror facet providing a corresponding focal plane. The device requires multiplexing the signal to read the signal received from the various focal planes. Since the rotating polygon mirror also scans the outgoing beam, the device may also not be readily compatible with existing scanner designs and only allows a certain number of discrete focal points (one focal point for each mirror facet). Moreover, changing between selected sets of focal points would require replacing mirror facets or making some other complicated hardware adjustment or modification.

SUMMARY OF THE INVENTION

The present invention relates to an optical system and method for data reading. The system includes (1) a light source which generates an optical beam directed toward an object, (2) a focusing lens and (3) a variable aperture optical element disposed in the outgoing optical path. The aperture size is smaller than the diffractive limit of the optical beam. This means that the aperture impinges on the optical beam enough so as to affect the beam propagation in accordance with diffraction theory. The waist position is then changed by varying the effective aperture size. In a preferred embodiment, the variable aperture optical element comprises a plurality of LCD (Liquid Crystal Display) bands. As the bands are selectively activated, the aperture size is correspondingly increased or decreased. When the light beam is focused to a waist at a given distance from the focusing lens, this waist may be moved closer to the focusing lens by decreasing the aperture size.

BRIEF DESCRIPTION OF THE DRAWINGS

FIG. 1 is a schematic diagram illustrating an optical system according to the present invention;

FIG. 2 is a diagrammatic top view of a portion of the optical system of FIG. 1 illustrating and an LCD embodiment;

FIG. 6 is a detailed scale view of an alternate LCD aperture element showing preferred dimensions;

FIG. 7 is a diagrammatic view of alternate LCD aperture element of a single rectangular panel pair;

FIG. 8 is a diagrammatic view of alternate LCD aperture element of a round iris configuration;

FIG. 9A is a diagrammatic view of alternate aperture element comprised of a rotating aperture;

FIG. 9B is a top plan view of the aperture element of FIG. 9A;

FIG. 9C is a cross sectional view of the aperture element of FIG. 9A taken along line 9C—9C;

FIG. 10 is a diagrammatic view of alternate mechanical aperture element of a round iris configuration;

FIG. 11 is a diagrammatic view of alternate mechanical aperture element comprised of a pivoting shutter configuration;

FIG. 12 is a diagrammatic view of alternate mechanical aperture element comprised of a sliding shutter configuration;

DESCRIPTION OF THE PREFERRED EMBODIMENT

Figure 3:
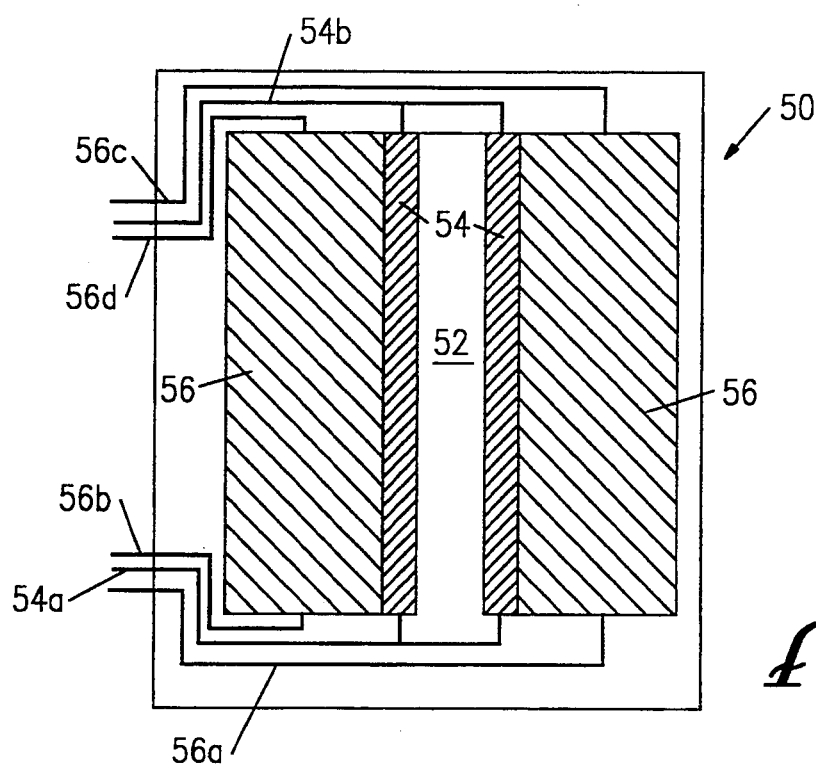
FIG. 3 is a detailed front elevation view of the LCD aperture element of FIG. 2.

The preferred embodiments will now be described with reference to the drawings. To facilitate description, any numeral identifying an element in one figure will represent the same element in any other figure.

FIG. 1 is a schematic diagram of an optical system such as that which may be employed by the present invention. A light source illustrated as a laser diode 10 emits light 15 being aimed at the desired target shown as the UPC bar code 35. Light 15 from the laser diode 10 is passed through focusing optics, illustrated in this embodiment as a focusing lens 20. The focused beam 15 passes through an aperture device 50. The portion of the beam 15 which passes through the aperture device 50 is reflected off fold mirror 25 and is directed toward a scanning mechanism shown in this embodiment as an oscillating mirror 30. As the oscillating mirror 30 pivots, the beam scans over a scanning beam range 32 along the bar code 35.

Light reflected or scattered off the bar code 35 is collected by a suitable collection system shown in this embodiment as being focused by a collection lens 40 and detected by the photodetector 45. The optics of the optical system are constructed such that the focusing lens 20 achieves a focal point at a distance from the system at or near the anticipated furthest position of the targeted bar code 35.

Though a preferred scanning mechanism and collection system have been described, any suitable scanning mechanism or collection system may be utilized in the present optical system. As for light sources, the light source 10 is preferably a laser diode, but may be any suitable light source including: a coherent light source such as a laser or laser diode, a non-coherent light source such as a light emitting diode, or combinations thereof. The focusing system may be comprised of one or more optical elements selected from the group consisting of: spherical, Fresnel and aspheric lenses or mirrors, holographic optical elements, and combinations thereof.

To clarify terminology, as used herein when referring to a scanner, the resolving axis shall refer to the axis of the spot along the scanning direction. The non-resolving axis shall refer to the direction perpendicular to the scanning direction.

FIGS. 1–2 illustrate the aperture device 50 positioned between the focusing lens 20 and the fold mirror 25. The aperture device 50 is preferably positioned downstream of the focusing lens 20 so that the beam 15 is converging as it passes through the aperture. The variable aperture device may however be located at other positions such as between the light source 10 and the focusing lens 20 or between the fold mirror 25 and the scanning mirror 30. Essentially, when control of the spot size in the resolving axis is desired (control of the waist position in the non-resolving axis is described below) the aperture mechanism 50 is preferably on the light source side of the scanning mirror 30. Alternately, the variable aperture mechanism 50 may be incorporated into the scanning mirror 30 itself, oscillating therewith.

In the configuration where the aperture mechanism were positioned on the target side of the scanning mirror, the shape of the beam could be manipulated for different parts of the scan, the aperture mechanism having a more complex structure, for example a series of apertures.

FIGS. 2–5 illustrate a preferred construction for the aperture mechanism 50. The aperture mechanism 50 has a rectangular central aperture 52 which is a light transmissive element such as clear glass. The width of the aperture 52 is arranged parallel to the scanning plane of the scanning beam 32, that is, in the resolving axis (referring to FIG. 2, the beam would scan in a plane parallel to the page). The aperture mechanism 50 has a first pair of transmissive LCD elements 54, 54 (the LCD pair comprising an LCD region which defines an aperture therebetween) symmetrically positioned on either side of the central aperture 52 and a second pair of transmissive LCD elements 56, 56 on either side of the first pair of transmissive LCD elements 54, 54. Both sets of LCD elements 54, 56 are mounted on a suitable glass substrate 51.

When an LCD is not energized, the polarization of light passing through it is rotated 90°. A sheet polarizer is placed beyond the LCD and is oriented 90° to the initial light polarization. This construction allows the light to pass through the sheet polarizer with minimum absorption when the LCD is not energized. When the LCD is energized, the polarization is no longer rotated. If polarized light is being passed through the LCD, the passage of light through the module may be selectively inhibited at the sheet polarizer upon energizing the LCD. In the application where the light source 10 is a laser or laser diode, the light is already about 99% polarized. The LCD regions are then arranged to inhibit passage of light through the module when energized. In the application where a non-coherent light source is used (or to further ensure desired polarization), a polarizing material is placed on both sides of the module and the areas where the LCD is activated will not allow light through the module.

The net effect of the aperture mechanism 50 is to have three separate foci $A_1$, $A_2$, and $A_3$ formed from a single axis of light merely by activating the respective pair of LCD regions or panels 54, 56 of the aperture mechanism 50. Specifically, when none of the pairs LCD regions 54, 56 are energized, the width of the effective aperture is A and the focus waist will then appear at point $A_1$. By energizing the outer LCD panels 56, 56 (preferably simultaneously), the width of the effective aperture is reduced to a dimension B. Since the dimension B is within (i.e. smaller than) the diffractive limit of the beam 15, the focus waist will now appear at point $A_2$. Subsequently, by also energizing the inner LCD panels 54, 54 and the outer LCD panels 56, 56, the width of the effective aperture is further reduced to a dimension C and the focus waist will now appear at point $A_3$.

Figure 4:
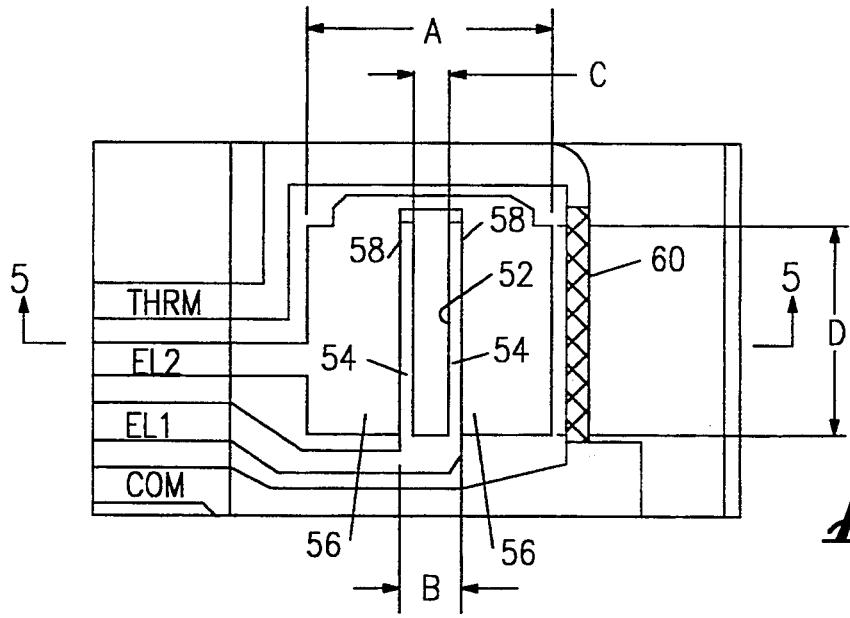
FIG. 4 is a detailed scale view of the LCD aperture element of FIG. 3 showing preferred dimensions.
Figure 5:
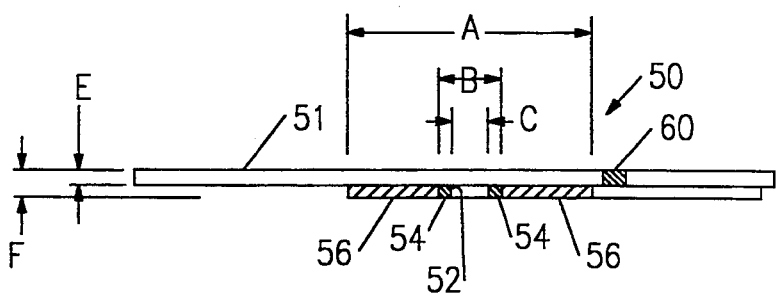
FIG. 5 is a cross sectional view of the LCD aperture element of FIG. 4 taken along line 5—5.

The following are a set of preferred dimensional values for the elements of aperture mechanism 50 set forth in FIGS. 4–5:

A=0.200 in. (5.1 mm)—the overall aperture outside of the LCD panels 56, 56.

B=0.050 in. (1.3 mm)—the aperture defined between the LCD panels 56, 56.

C=0.030 in. (0.75 mm)—the aperture defined between the LCD panels 54, 54.

D=0.17 in. (4.3 mm)—the height of the active LCD cell.

E=0.020 in. (0.51 mm)—the thickness of the glass substrate 51.

F=0.040 in. (1.0 mm)—the total thickness of the aperture 50.

In data reading applications such as bar code scanning systems, this design provides several advantages. A system with three discrete focal points $A_1$, $A_2$, and $A_3$ would have three different depths of field regions (one for each focal point) resulting in an overall greater depth of field than a conventional system with only a single focal point. The system is electrically controllable with no moving parts. Since the LCD regions are readily actuated, such a design is simple and relatively inexpensive and does not require complicated movable focusing elements.

The specific design of the variable aperture mechanism 50 will depend on various factors for a particular application including the number of focal points desired, the type of light source, light source intensity distribution, target size and type, and external factors such as the desired distances to the focal points, spot diameters at the focal points, aperture stops including outside of the lens system, lens diameter(s), and cost constraints. The example of FIGS. 3-4 is merely a preferred example which may be particularly useful in a handheld bar code scanner. In one example tested (using a mechanical aperture of a construction similar to the one in FIG. 12 described below), without the variable aperture mechanism 50, the unmodified scanner would have the capability of reading a 13 mil (330 micron) labels over a range of 30–60 inches (760–1520 mm) whereas with the variable aperture mechanism 50, the scanner could effectively read over a much broader range of 6–60 inches (150–1520 mm).

At first glance it may appear problematic that the addition of an aperture in the light path operates to reduce total light intensity. However, the light intensity loss due to aperture reduction is compensated for by the nearer waist location actuated by the smaller aperture. The compensation is due to the fact that light intensity varies in proportion to $1/x^2$ (x being the distance from the light source).

Though multiple waist positions are often desirable, in certain other configurations, only a single waist position may be desired. The aperture mechanism 50 may provide a preset focal point, set by the manufacturer, the system assembler, or the technician (or alternately the user by actuation of an external switch). In such a system, a single scanner assembly design may be employed and the manufacturer (for example) need only select the appropriate aperture setting corresponding to the desired focal position. Manufacturing costs may be reduced as only a single scanner design need be manufactured without requiring complicated hardware modifications. Further, by allowing easy adjustment of the spot size, the required mechanical tolerances of the other optics may be reduced.

In order to have separately addressable LCD regions, in current technology, a non-active region is required between the LCD regions. As viewed in FIGS. 3-4, the non-active regions 58, 58 (shown only as a dark lines 58, 58 in FIG. 4) separate the inner LCD panels 54, 54 from the outer LCD panels 56, 56.

FIG. 6 illustrates an alternate LCD aperture element 150 also showing preferred dimensions for the inner LCD panels 154, 154, the outer LCD panels 156, 156, and the central aperture 152. In order to ensure separately addressable LCD regions and to provide for easier construction, a larger non-active region is required between the inner LCD panel regions 154, 154 and the outer LCD panel regions 156, 156. The non-active regions 58, 58 (shown as the cross-hatched strips 158, 158) separate the inner LCD panels 154, 154 from the outer LCD panels 156, 156. The preferred dimensions are as follows:

G=0.200 in. (5.1 mm)—the overall aperture outside of the LCD panels 156, 156.

H=0.050 in. (1.3 mm)—the aperture defined between the LCD panels 156, 156 inside of non-active regions 158, 158.

I=0.005 in. (0.13 mm)—the thickness of the non-active region 158.

J=0.030 in. (0.75 mm)—the aperture defined between the LCD panels 54, 54.

K=0.17 in. (4.3 mm)—the height of the active LCD cell.

Figure 13:
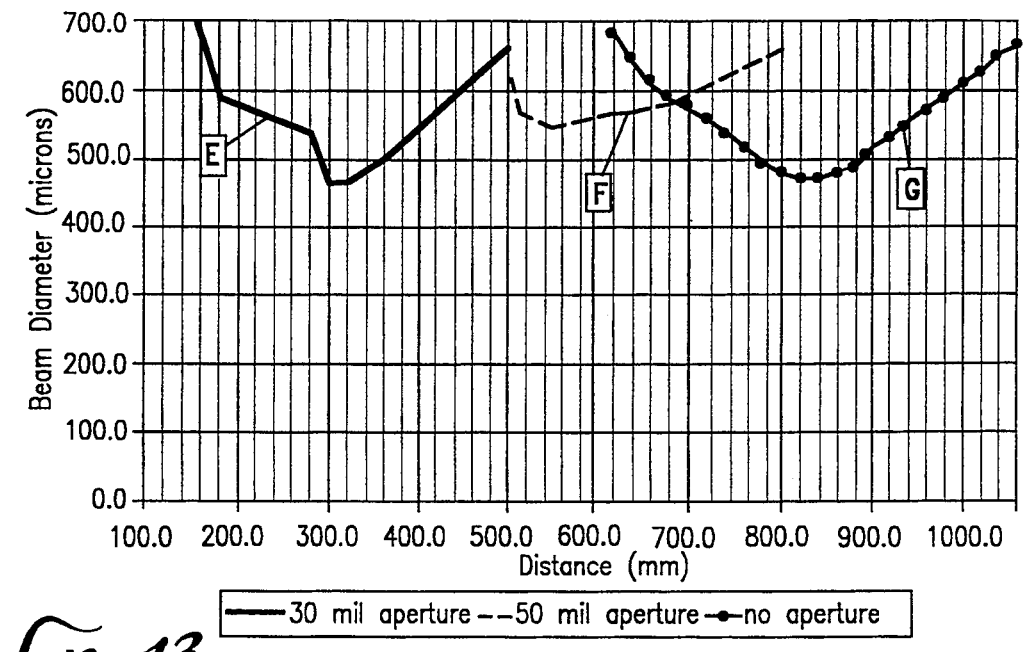
FIG. 13 a graph illustrating plots of example spot diameters for an example multi-aperture variable focus LCD aperture element.

FIG. 13 is a graph of experimental data showing optical performance of one example embodiment of the optical system employing a mechanical aperture which applied the aperture dimensions of the aperture mechanism 50 of FIGS. 2-5. The x-axis shows where a value on the curve is calculated as the distance from the lens in mm. (This is the distance between, for example, aperture mechanism 50 and point $A_3$ in the short focus case of FIG. 2.) The y-axis represents the spot diameter in the resolving axis of a laser beam focused by the system. This spot diameter is expressed in microns (units of $10^{-3}$ mm) and is measured at the width of the focused laser beam where the intensity is $1/e^2$ times as large as at the center of the focused beam.

The graph of FIG. 13 shows three different curves of data. The solid line Curve E represents the change in spot diameter for a laser beam with a wavelength of 670 nm, with a best focus diameter (in the resolving axis) of about 470 microns, the near focal point $A_3$ (when both LCD panels 54, 56 are energized) is located about 300 mm from the aperture. On either side of the best focus, the spot diameter gets larger, as shown in the solid curve.

The dashed line Curve F represents the intermediate focus point $A_2$ created by energizing only the outer LCD panels 56. In this case the focus point $A_2$ has been positioned at about 560 mm and has a minimum spot diameter in the resolving axis of about 560 microns. The dotted line Curve G represents the far focus point $A_1$ created with neither LCD panel 54, 56 energized. In this case, the focus point $A_1$ has been positioned at 850 mm and has a minimum spot diameter in the resolving axis of 480 microns.

To illustrate how this system would extend depth-of-field over a conventional single focus system, an example signal processing system will now be considered. In one kind of signal processing, it may be possible to successfully "decode" signals scanned where the $1/e^2$ spot diameter of the spot is 2.0× as large as the minimum bar width being scanned. Using this assumption as a guideline, a spot 700 microns in diameter would be able to read bar codes with a bar width of 700/2.0 microns, which is 350 microns. If the spot size is 700 microns or smaller, then, it is possible under this signal processing assumption that a scanner could "decode" labels of 350 microns or larger.

Now, drawing a line H across curves E, F and G at the 700 micron spot size point, it may be seen that the short focus aperture setting lens element will be able to resolve the 350 micron bar widths over a distance of about 340 mm, or from 160 mm (at the closest point) to a distance of 500 mm (the furthest point). The intermediate aperture setting will be able to resolve the 350 micron bar widths over a distance of about 300 mm, or from 500 mm to 800 mm. The far aperture setting will be able to resolve the 350 micron bar with this over a distance of about 440 mm, or from 620 mm to 1060 mm. Thus by cycling through the three aperture settings, the device may decode the labels of 350 microns or larger from 160 mm to 1060 mm.

FIG. 7 illustrates another alternate LCD aperture mechanism 250 having a single set of LCD panels 256a, 256b defining a central aperture 252. The first LCD panel 256a is connected to a controller (see FIG. 15 below) by connection elements 257a and 256b. The second LCD panel 256b is also connected to the controller by connection elements 257c and 257d. The operation of the LCD aperture mechanism 250 is similar that described of previous LCD aperture embodiments. The aperture mechanism 250 controls only a single aperture region by LCD panels 256a, 256b, preferable activated in unison. This embodiment may be particularly applicable to grey-scaling techniques, described below, to provide a continuously variable or controllable waist position.

Alternate aperture mechanisms may be designed for given applications. In FIGS. 2-5, the aperture mechanism 50 is configured from a plurality of longitudinal LCD panels 54, 56 with the width of the aperture (corresponding to the resolving axis) being incrementally varied by selective activation of the LCD panels 54, 56. The LCD regions may alternately be rectangular as shown in the previous embodiments or may alternately be circular, oval or any desired geometry or configuration to vary the waist location in two dimensions.

FIG. 8 illustrates such an alternate geometry for the aperture comprising LCD aperture mechanism 350 having a single circular LCD panel 356 defining a central aperture 352. The LCD panel 356 is connected to a controller (see FIG. 15 below) by suitable connection elements. By forming a round (or any other suitable shape) aperture 352, the spot size (i.e. at a given waist position) is controlled in both axes. For example as applied to a 2-D bar code, control of the focal point location would be provided in both the resolving and the non-resolving axis. The operation of the LCD aperture mechanism 350 is similar to that described of previous LCD aperture embodiments. This embodiment may be particularly applicable to grey-scaling techniques, described below, to provide a continuously variable or controllable waist position. The aperture mechanism 350 controls only a single aperture region by LCD region 356, but may alternately be comprised of a second or more circular LCD regions concentrically positioned relative to the first region.

Though the aperture regions may be incrementally activated to obtain discrete waist positions (discrete meaning that the change in waist position is incremental—similar to a step function), the LCD regions may be partially activated to block some, but not all of the light passing therethrough. Tests have shown that the beam waist position may be moved to any intermediate position between the near and far waist locations as defined by an inactive and fully active LCD aperture region. Using the methods similar to those used by portable computer manufacturers to generate continuously variable grey-scale on a liquid crystal display screen (by for example varying the applied voltage), the LCD aperture may be adjusted to a desired grey value thereby "setting" the beam waist at any selected intermediate location.

Figure 14:
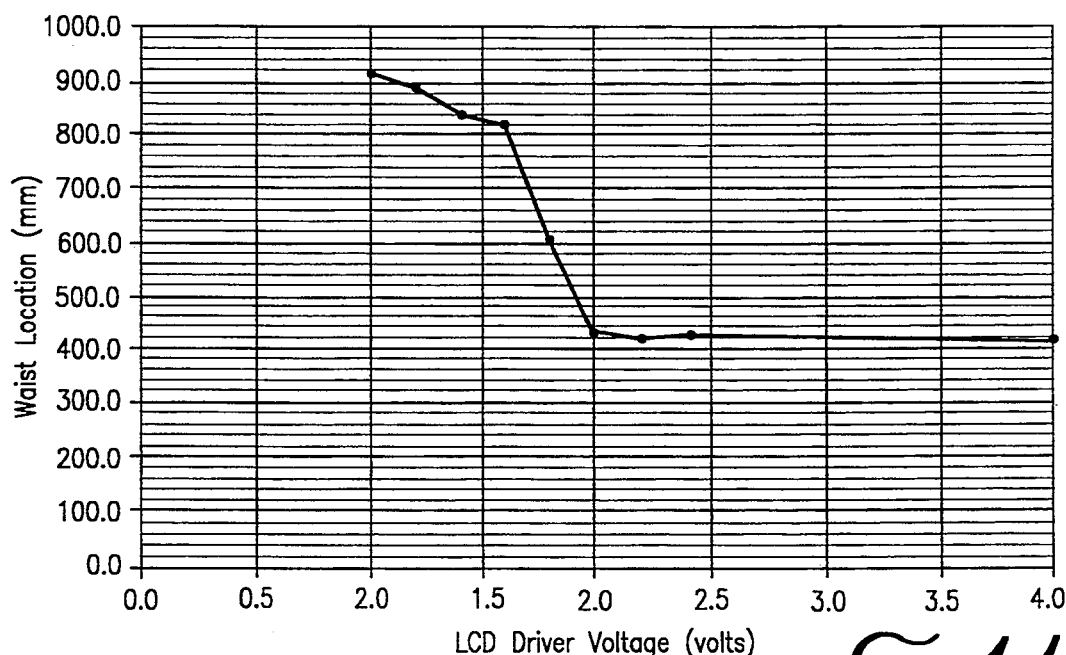
FIG. 14 a graph illustrating the shift in waist position as the LCD drive voltage is varied which changes the grey-scale.

FIG. 14 is a graph illustrating results of a test where the shift in waist position by grey-scaling is controlled by varying the drive voltage applied on an LCD aperture device 250 such as that shown in FIG. 7. As the voltage applied to the LCD is varied, the percent activation of the LCD is adjusted from 0% to 100%. As shown in the graph, by increasing the voltage applied to the LCD from 0 to 2.0 volts, the waist location is moved from 910 mm to 410 mm from the aperture.

The grey-scale, continuously variable aperture technique therefore provides a continuously adjustable (or selectable) focal point. By selecting a given LCD activation level (such as by applying a given voltage to the LCD), any desired waist position within the range may be achieved. Such a continuous focus system has a variety of applications. One highly desirable application is automatic focus provided some sort of feedback is available. Distance measurement techniques such as an optical or ultrasonic (such as those employed by autofocus cameras) is one focus feedback method, but other methods may be employed such as focus error techniques may be employed. For example, optical sensors in the beam path may determine the scan distance and provide a signal to the aperture controller which may be used to select the desired aperture provided by the variable aperture mechanism. Alternately, the scan return signal may be observed (analog or digital) and then determined whether the symbol (e.g. the bar code) is being accurately reproduced. By sweeping through the focal point range, it can be determined at what focal position provides the most successful scanning operation.

This waist location shift is a diffractive phenomena. The aperture size is smaller than the diffractive limit of the optical beam, i.e., the aperture impinges on the optical beam, enough so as to affect the beam propagation in accordance with diffraction theory. The phase and spatial intensity of the light wavefront at the variable aperture device is therefore being modified. In the case of the LCD, the spatial intensity is being modified. This phenomena can be used to alter the beam profile at a given location as well as move the waist location. Alternately, materials that change the optical phase of the wavefront when electrical or optical signals are applied to them (i.e. non-linear optical materials) may be used in place of the LCD. In these cases, selective regions may be activated and the wavefront phase be modified. This alternate structure may be designed to alter the waist location or change the beam profiles to allow improved performance. These materials are currently expensive but may prove economically viable in the future.

The LCD can be designed to form a wide variety of spatial intensity profiles. This technique can be extended to the situation of creating an Electronic Holographic Optical Element or Binary Optical element. This element is an optical element that has no curvature, but has regions that are opaque which form a diffraction pattern that has an intensity profile suitable for resolving the bar code.

Figure 15:
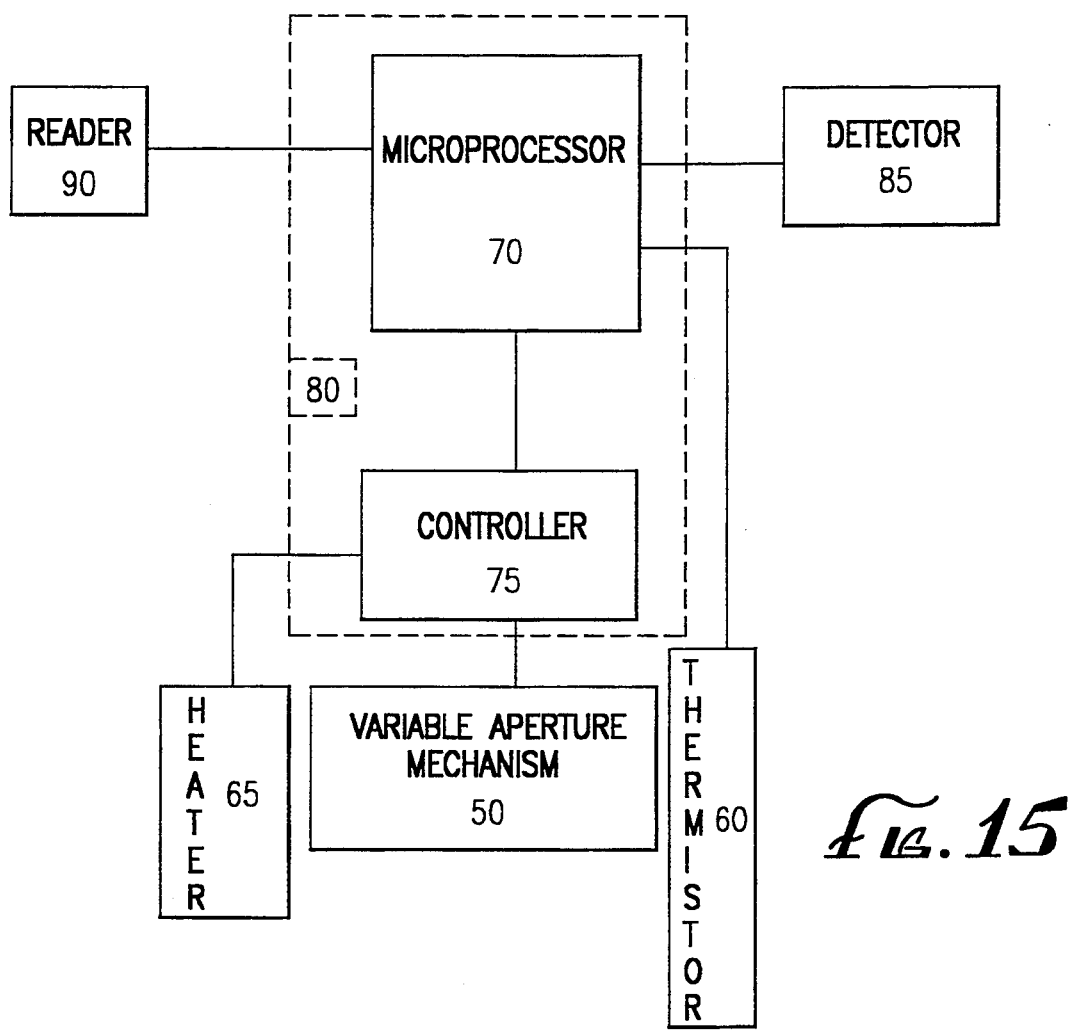
FIG. 15 diagrammatically illustrates a preferred control method for driving the LCD module.

FIG. 15 diagrammatically illustrates a preferred control method used to drive the LCD module (such as the variable aperture mechanism 50 of FIGS. 4–5) with a microprocessor 70 that is already present in the scanner. The microprocessor 70 signals the controller 75 (the two may be combined into a single microprocessor unit 80) to activate the LCD regions to the desired intensity. The microprocessor 70 is used to perform operations on the digital signal received from the detector 85 and prepare it to be sent to the reader 90 (such as a Portable Data Terminal which decodes the signal and sends it to a host computer). Since information such as wide-to-narrow ratios and number of digital transitions are calculated by the microprocessor 70, the information can be used to determine if the beam size is small enough (relative to the bar code size, for example) to resolve the smallest bars and spaces. The microprocessor 70 uses this information as feedback to adjust the waist location by increasing or decreasing the LCD activation level. Given the teachings herein, one skilled in the art could develop suitable software to optimize the system for a given application.

The response time of the liquid crystal material may be highly dependent upon temperature. For example, if the response time of the liquid crystal material is 10 msec at 20° C., it will increase to 100 msec at −20° C. The aperture mechanism may be therefore be provided with a temperature measurement device shown in FIGS. 4–5 as a thermistor trace 60 placed on the glass substrate 51 adjacent the LCD panels 54, 56. The thermistor can also be placed elsewhere in the scanner as long as the ambient temperature is similar to that of the LCD. The system may then be controlled by monitoring the temperature and altering the operation for different temperatures. Referring again to FIG. 15, a signal from the thermistor 60 may be digitized and read by the microprocessor 70. The microprocessor 70 receives information from thermistor 60 and through suitable applications software, may control the way the LCD region of the aperture mechanism 50 is activated as a function of the temperature. For example, when sweeping or cycling across the focal range, the LCD regions may be activated for a longer period of time if the temperature is lower in order to accommodate for the increase LCD rise time.

Even without distinctly varying the LCD regions, the inherent rise and fall time for the LCD regions may allow for a sweep of LCD intensity from minimum to maximum. During the transition time, several scans may take place while the LCD intensity rises. During the change of intensity, grey-scaling occurs varying the beam waist from between the maximum and minimum distances.

To avoid temperature variation, the system may be provided with a heating element 65 in proximity to the aperture mechanism 50. The heating element may be controlled by a suitable thermostat, such as by controller 75 on the basis of the temperature detected by the thermistor 60.

In some scanners, the existing microprocessor may already have an E²PROM available for use. This E²PROM may also be used as a look-up table for LCD activation parameters in the temperature compensation control scheme or for some grey-scale control. For example, the voltage level required to establish a certain grey-scale will vary from unit to unit and over the operating temperature range. Discrete values for the voltage can be measured and input during the scanner manufacturing process and written into memory. For a given measured operating temperature, the look-up table would provide the information of a voltage correction which would compensate for temperature. This procedure may greatly simplify the electronics and improve performance over temperature range.

Figure 16:
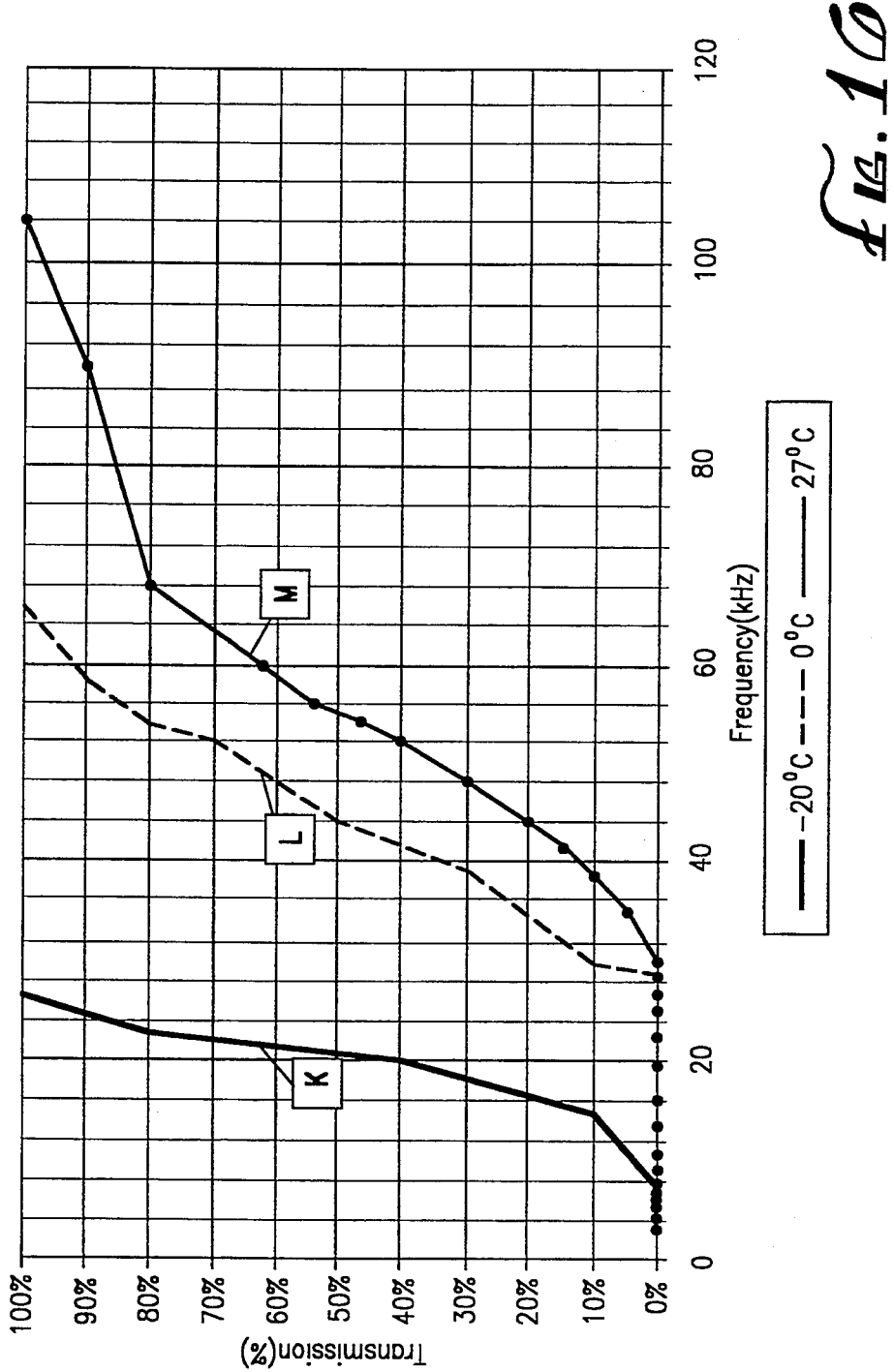
FIG. 16 a graph illustrating the frequency dependence of LCD grey-scaling for different temperatures.

Grey-scaling of the LCD regions may also be accomplished by driving the LCD regions at frequencies much higher than the normal operating frequency. FIG. 16 shows experimental data for one sample. As the frequency increases, the liquid crystal molecule alignment becomes less pronounced and the region blocks less light. As the temperature increases, the frequency limit also increases. In FIG. 16, curve K shown by a solid line illustrates how the transmission varies with frequency at a temperature of −20° C. Curve L shown by a dotted line illustrates how the transmission varies with frequency at a temperature of 0° C. Curve M shown by a dashed line illustrates how the transmission varies with frequency at a temperature of 20° C. Though it appears that a frequency controlled LCD is more sensitive to temperature fluctuation than voltage control, frequency control may be viable option since the microprocessor can readily change the drive frequency.

The voltage can be changed to establish a grey-scaling circuit by using an RC circuit with a time constant below the expected processor output frequency (10 kHz–30 kHz). By varying the drive frequency with the processor, the AC signal that is passed through the LCD will also vary. A higher frequency will yield a lower peak-to-peak voltage across the LCD and produce the desired grey-scale effect. Separate electronics can be used to convert the frequency or duty cycle output from the controller to a voltage level which controls the LCD drive voltage.

Alternately, the aperture size may be varied in the non-resolving axis to vary the waist location of the beam in the non-resolving axis (thereby controlling astigmatism). By controlling the beam waist position with an aperture device in the non-resolving axis, the spot size (at a given distance) in the direction perpendicular to the scan direction may be controlled. Depending upon the particular application, it may be desirable to control the spot size in the non-resolving axis, that is the axis perpendicular to the scanning plane. In certain symbols, such as printed bar codes (such as dot matrix printed codes), the lines may contain voids and the spaces may contain specks. If the scanning beam was focused to a fine point in all directions, the scanner may detect the void as a space or the specks as a bar producing a false read. For this reason, it may be desirable to produce an oval or elliptical shaped spot with a larger diameter in the non-resolving axis. The smaller diameter in the resolving axis allows resolution along the bars and spaces while the larger diameter in the non-resolving axis allows the spot being read to average out so that specks and voids do not cause a false read.

Though the electrically actuable LCD aperture mechanism has many advantages, other aperture mechanism designs may be used. FIGS. 9A, 9B and 9C illustrate another alternate aperture comprising a rotating aperture device 450 comprising a plate 454 with a central rectangular aperture 452. The plate 454 is mounted to a center post 457 that is perpendicular to the optical axis. As the post is rotated, the projection of the aperture 452 along the optical axis becomes thinner until the effective clear aperture in the resolving axis is very small. In one test example with an aperture 452 having a width of 2.0 mm, the distance of the waist from the laser module moved from 1100 mm to 245 mm as the aperture was rotated from 0° to 75°. The waist diameter (along the resolving axis) changed from 610 microns to 436 microns. The system may therefore be designed to read at a maximum distance. By adding a small rotating aperture mechanism 450 in the beam path and selectively rotating the aperture 452 to only a few angle settings, the waist may be moved from the furthest distance to other intermediate distances. The scanner then sends the information to the decoder from all scan distances and the decoder then decodes whichever scans it can.

FIG. 10 illustrates another mechanical aperture comprising an aperture device 550 including a plate 554 with a round central aperture 552. The aperture device 550 may be similar to the iris of a camera, movable to an aperture diameter of a desired size. Providing a round aperture geometry, the iris type aperture device 550 will control waist location in two dimensions. Such an iris device may alternately may be designed to provide an oval or other shaped aperture.

FIG. 11 illustrates another mechanical aperture comprising a dual shutter aperture device 650 including a first pivoting shutter element 654a which oscillates on pivot rod 657a and second pivoting shutter element 654b which oscillates on pivot rod 656b. In tandem, the shutter elements 654a and 654b form a variable aperture 650. By controlling the motion of the shutter elements 654a and 654b, such as actuated by a motor operably connected to the rods 657a and 657b, the size of the aperture 652 may be selectively varied. In the illustrated embodiment, the shutter elements 654a and 654b rotate in the same direction when varying the aperture size. Alternately, if the initial position (from that illustrated) of one of the shutter elements were rotated 90°, the shutter elements would be rotated in opposite directions.

FIG. 12 illustrates another mechanical aperture comprising a dual panel aperture device 750 including a first sliding panel element 754a and a second sliding panel element 754b. The panel elements 754a and 754b move in tandem, both moving inwardly to reduce the size of the aperture 752 or moving outwardly to increase the size of the aperture 752. In tandem, the shutter elements 754a and 754b form a variable aperture 752. By controlling the motion of the shutter elements 654a and 654b, such as actuated by a motor mechanism operably connected to thereto, the size of the aperture 752 may be selectively varied.

Alternately, a system may include multiple aperture mechanisms, combining one or more of any of the above described aperture mechanisms (arranged in series for example) within a single system. For example, a system may include two LCD aperture mechanisms (such as a pair of the aperture device 50 of FIGS. 2–4) positioned in series in the beam path with one rectangular LCD aperture device arranged to control waist position in the resolving axis and the other rectangular LCD aperture device arranged to control waist position in the non-resolving axis. By providing them with independent control connection, such a dual aperture mechanism configuration permits independent control of waist position in both the resolving and the non-resolving axes. Of course the two aperture mechanisms could be controlled by a single signal and still modify waist position in both axes. Such a dual axis control system would be particularly useful in scanner applications which produces a raster scan pattern, such as certain fixed scanners.

Figure 17:
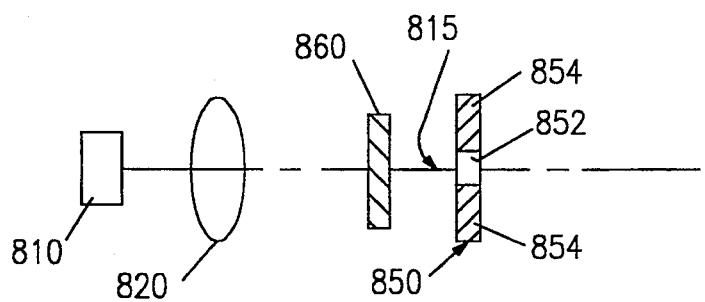
FIG. 17 is a schematic diagram of an alternate polariziation adjustment system.

In another alternate embodiment, the amount of polarization of the incoming optical beam (i.e. the beam entering the aperture) may itself be adjusted. In this embodiment, the aperture mechanism may comprise an LCD (such as LCD aperture 250 in FIG. 7) or simply a sheet of polarized material having a central aperture of a configuration of the aperture 250 of FIG. 7 where the regions 256a and 256b are merely polarized material. By varying the polarization of the incoming optical beam and passing it through the polarized aperture, a grey-scale or incremental-type waist location adjustment may also be achieved. One such embodiment is shown in FIG. 17 in which the aperture mechanism 850 comprises a sheet of polarized material having a central aperture 852. The panels or bands 854, 854 (which be rectangular, round or some other shape) are polarized material. As the polarization of the incoming optical beam 815 entering the aperture mechanism 850 is varied, the amount of light passing through the panels 854 is adjusted creating the grey-scale waist adjustment. The polarization of the incoming light 15 may be adjusted in several ways. The light source 810 itself may be rotated about the axis of the beam 815 or may be electronically controlled (for example by varying power frequency) to adjust polarization. Alternately a polarization device 860 which adjusts the polarization of light as it passes therethrough, may be disposed upstream of the aperture mechanism 850. The device 860 may be an liquid crystal panel controllable by suitable means. Alternately the device 860 may be a simple sheet of polarized material which is rotatable about the axis of the beam 815 (in this instance a randomly polarized light source 810 is preferred for efficiency reasons). Alternately, the aperture mechanism 850 (preferably having a circular central aperture to be symmetric) may be rotated about the axis of the beam 815.

The variable aperture mechanism described herein may also be used in combination with other variable-focus techniques. Such techniques include for example (1) mechanical devices such as a focusing lens designed with an axially movable lens element to permit changing of the position of the focal point, (2) the rotatable optical polygon mirror device of U.S. Pat. No. 4,560,862 which has a plurality of facets, each mirror facet being of a different curvature, or (3) some actively changeable focusing optical element.

The variable aperture mechanism (which controls beam waist position) may also be used to improve "speed-to-read" i.e. the time it takes the scanner to perform a successful scan. When the aperture controlled system obtains a successful scan, it has the information as to what aperture setting was used to accomplish the successful scan. Since a particular user frequently will perform a number of similar tasks consecutively, the desired focus distance is likely to be nearly the same for consecutive scans. The control processor may then store information as to a particular user (it is of note that a checkout clerk typically inputs an employee number to the register) or alternately store recent successful scan distances. The processor may then select a preferred starting aperture setting, for example the setting at the most recent successful scan. If in fact the user is scanning an item at a similar distance to that of the previous item, time-to-read may be enhanced since the variable focus has an initial setting at a successful scan distance.

Thus, an optical system and method capable of variable and/or selectable focal planes have been shown and described. Though described with respect to a preferred embodiment of an optical scanning device such as a bar code scanner, the device may be employed by other focusing mechanisms such as those employed by data transfer devices (such as readers and encoders), particularly those using laser light such as laser printer and compact disc technologies. Though certain examples and advantages have been disclosed, further advantages and modifications may become obvious to one skilled in the art from the disclosures herein. The invention therefore is not to be limited except in the spirit of the claims that follow.

What is claimed is:

1. An optical system for data reading, comprising:
   a light source generating an optical beam along an outgoing optical path toward an object to be read;
   a focusing system positioned in the outgoing optical path for focusing the optical beam to a given focal point;
   means for varying position of the focal point of the optical beam comprising an aperture device positioned in the outgoing optical path, the aperture device comprising a module with a plurality of LCD regions wherein activation of certain of said LCD regions defines and varies an opening therethrough of a plurality of different size aperture widths;
   a scanning apparatus for receiving the optical beam which has passed through the aperture device and for producing a scanning pattern of the optical beam toward the object; and
   a detector for detecting light reflecting and/or scattered off the object.

2. An optical system according to claim 1 wherein the aperture width is of a size smaller than a diffractive limit of the optical beam.

3. An optical system according to claim 1 wherein the LCD regions comprises a single LCD which when activated defines a round opening of a given width.

4. An optical system according to claim 1 wherein upon activation of a given LCD region, essentially all the optical beam passing through the given LCD region is inhibited from passing through the module.

5. An optical system according to claim 1 wherein the aperture formed by the variable aperture device is concentrically positioned in the outgoing path of the optical beam.

6. An optical system according to claim 1 wherein the aperture formed by the aperture device is round, its width being variable in both the resolving axis and the non-resolving axis.

7. An optical system according to claim 1 wherein the aperture formed by the aperture device is rectangular with its width being variable in a direction corresponding to the scanning direction of the scanning apparatus.

8. An optical system according to claim 1 wherein the aperture device comprises a first aperture width defined by a first opposing pair of LCD panels.

9. An optical system according to claim 1 wherein the light source is selected from the group consisting of: lasers, laser diodes, coherent light sources, light emitting diodes, non-coherent light sources, and combinations thereof.

10. An optical system according to claim 1 wherein the optical system comprises a laser bar code scanner.

11. An optical system according to claim 1 wherein the focusing system comprises one or more optical elements selected from the group consisting of: spherical, Fresnel and aspheric mirrors or lenses, holographic optical elements, and combinations thereof.

12. An optical system according to claim 1 wherein the LCD regions comprise a pair of LCD panels symmetrically positioned about a central axis along the outgoing optical path thereby defining an aperture width.

13. An optical system according to claim 12 wherein the aperture device further comprises a second aperture width defined by a second pair of opposing LCD panels located adjacent radially inward of said first pair of LCD panels wherein the first and second pairs of LCD panels are selectively activatable and wherein activation thereof inhibits passage of light through the module thereby varying aperture size.

14. An optical system for data reading comprising:
   a light source generating an optical beam along an outgoing optical path toward an object to be read;
   a focusing system positioned in the outgoing optical path for focusing the optical beam to a given waist location;
   a module positioned in the outgoing optical path, the module comprising LCD regions arranged to define at least one aperture width, the module varying position of the waist location upon activation of the LCD regions;
   a scanning apparatus for receiving the optical beam which has passed through the module and for producing a scanning pattern of the optical beam toward the object;
   a detector for detecting light reflecting and/or scattered off the object; and
   a controller connected to the LCD regions for activating the LCD regions to a desired activation level less than fully activated thereby selecting a degree to which the optical beam is inhibited from passing through the module thereby positioning the waist at a desired location.

15. An optical system for data reading comprising
   a light source generating an optical beam along an outgoing optical path toward an object to be read;
   a focusing system positioned in the outgoing optical path for focusing the optical beam to a given waist location;
   a module positioned in the outgoing optical path, the module comprising LCD regions arranged to define at least one aperture width, the module varying position of the waist location upon activation of the LCD regions;
   a scanning apparatus for receiving the optical beam which has passed through the module and for producing a scanning pattern of the optical beam toward the object;
   a detector for detecting light reflecting and/or scattered off the object; and
   a controller connected to the LCD regions for selectively controlling variable amount of polarization in the LCD regions to variably inhibit passage of the optical beam through the module thereby positioning the waist at a desired location.

16. An optical system according to claim 15 wherein the controller controls polarization by adjusting electrical voltage applied to the LCD regions.

17. An optical system according to claim 15 wherein the controller controls polarization by adjusting electrical frequency applied to the LCD regions.

18. An optical system for data transfer, comprising:
a light source generating an optical beam along an outgoing optical path toward a target object;
focusing means positioned in the outgoing optical path for focusing the outgoing beam to a waist position at a given distance from the optical system;
an aperture mechanism defining an aperture opening positioned in the outgoing optical path on a side of the focusing means opposite the light source, the aperture mechanism selectively varying size of the aperture opening for moving the waist position of the outgoing beam to a new distance closer to the optical system.

19. An optical system according to claim 18 wherein the aperture is of a size smaller than a diffractive limit of the optical beam.

20. An optical system according to claim 18 wherein the aperture mechanism comprises a panel having one or more actuable LCD regions, wherein activation of certain of said LCD regions inhibits passage of light through the aperture mechanism thereby defining and varying a width of the aperture opening.

21. An optical system according to claim 20 wherein LCD regions are separately actuable and define at least one effective aperture therein.

22. An optical system according to claim 18 wherein the aperture opening is concentrically positioned in the outgoing path of the optical beam.

23. An optical system according to claim 18 wherein the focusing means comprises one or more optical elements selected from the group consisting of: spherical, Fresnel and aspheric mirrors or lenses, holographic optical elements, and combinations thereof.

24. An optical system according to claim 18 wherein the aperture mechanism comprises a plate with a central aperture, the plate being rotatable about a center axis which is perpendicular to the outgoing optical path, wherein as the plate is rotated about its center axis to a desired degree, an effective width of the central aperture is projected defining the aperture opening.

25. An optical system according to claim 18 wherein the aperture mechanism comprises a first pivoting shutter element and a second pivoting shutter element defining the aperture opening therebetween, the aperture opening being variable corresponding to the degree of pivoting of the first and second the shutter elements.

26. An optical system according to claim 18 wherein the aperture mechanism comprises a mechanical iris.

27. An optical system according to claim 18 wherein the aperture mechanism comprises a first sliding panel element and a second sliding panel element defining the aperture opening therebetween, the first and second panel elements moving in tandem, either both moving together or both moving apart, to selectively size of the aperture opening.

28. An optical system for data transfer comprising:
a light source generating an optical beam along an outgoing optical path toward a target object;
focusing means positioned in the outgoing optical path for focusing the outgoing beam to a waist position at a given distance from the optical system;
an aperture mechanism positioned in the outgoing optical path, the aperture mechanism comprising LCD regions for moving the waist position to a new distance from the optical system upon activation of the LCD regions;
a controller connected to the LCD element for activating the LCD regions to a desired activation level less than fully activated thereby selecting a degree to which the optical beam is inhibited from passing through the aperture mechanism for positioning the waist at a desired location.

29. A method for data reading comprising the steps of:
emitting an outgoing beam of light from a light source toward an object to be read;
focusing the outgoing beam with a focusing element along an outgoing beam path to a waist at a first distance from the focusing element;
repositioning the waist between a desired second distance and a desired third distance nearer to said light source by
passing the outgoing beam through an aperture device having LCD regions disposed in an LCD modules, the LCD regions alternately defining an aperture opening of a first size and a second size and
selectively actuating the LCD regions to define the aperture opening to the first size to position the waist at the second distance and to define the aperture opening to the second size to position the waist at the third distance; and
detecting a signal reflected and/or scattered off the object.

30. A method for data reading according to claim 29 further comprising
determining the distance from the aperture device to the object being read;
adjusting the size of the aperture within the aperture device to position the waist at a desired location corresponding to the distance determined.

31. A method for data reading according to claim 29 further comprising
sweeping the aperture device through its available range of aperture settings;
processing the signal detected until a successful read is accomplished.

32. A method for data reading according to claim 31 further comprising
storing information on the setting which accomplished the successful read;
on a subsequent reading operation, initially adjusting the aperture to the setting which accomplished the successful read.

33. A method for data reading comprising the steps of:
emitting an outgoing beam from a light source toward an object to be read;
directing the outgoing beam along an outgoing beam path;
positioning the waist of the outgoing beam at a desired distance by:
passing the outgoing beam through a first LCD region in an LCD module, the first LCD region defining a first aperture;
polarizing the outgoing beam entering the first aperture;
varying effective aperture size of the first aperture by activating the first LCD region to a desired level less than fully activated.

34. A method for data reading according to claim 33 further comprising moving the waist to a desired position by setting a voltage applied to the first LCD region to achieve a desired partial polarization thereof.

35. A method for data reading according to claim 33 further comprising selecting a desired waist position by setting a frequency applied to the LCD regions to achieve a desired partial polarization thereof.

36. A method for data reading comprising the steps of:
- emitting an outgoing beam from a source toward an object to be read;
- focusing the outgoing beam along an outgoing optical path;
- passing the outgoing beam through an LCD module having at least a first LCD region defining a first aperture;
- adjusting the transmissivity of the first LCD region to create a grey-scale control for positioning the waist at any desired location within an available range of the aperture device.

37. A method for data reading comprising the steps of:
- emitting an optical beam from a source toward an object to be read;
- focusing the optical beam along an outgoing optical path;
- positioning the waist to a desired location by passing the optical beam through an aperture device;
- passing the optical beam through a polarized element having an aperture comprising the aperture device; and
- positioning the waist of the optical beam at any desired location within an available range of the aperture device by adjusting the polarization of the optical beam entering the aperture device.

* * * * *

UNITED STATES PATENT AND TRADEMARK OFFICE
CERTIFICATE OF CORRECTION

PATENT NO. : 5,347,121
DATED : September 13, 1994
INVENTOR(S) : Robert W. Rudeen It is certified that error appears in the above-indentified patent and that said Letters Patent is hereby corrected as shown below:

In column 15, line 8, change "outgoing" to --optical--.

In column 15, line 19, after "aperture" insert --opening--.

In column 15, line 58, before "size" insert --vary--.

In column 15, line 64, change "outgoing" to --optical--.

On sheet 1 of the drawings, Fig. 1, delete the wording "(BEAM SPLITTER)" and to the right of element 25, delete elements 17 and 27.

Signed and Sealed this

Ninth Day of May, 1995

Attest:

BRUCE LEHMAN

*Attesting Officer*  *Commissioner of Patents and Trademarks*